Nov. 8, 1938.  A. R. MUIRHEAD  2,136,147
LOCKING DEVICE
Filed Aug. 15, 1935  2 Sheets-Sheet 1

INVENTOR
ALFRED R. MUIRHEAD
BY
ATTORNEY

Nov. 8, 1938.                A. R. MUIRHEAD                2,136,147
                              LOCKING DEVICE
                           Filed Aug. 15, 1935            2 Sheets-Sheet 2
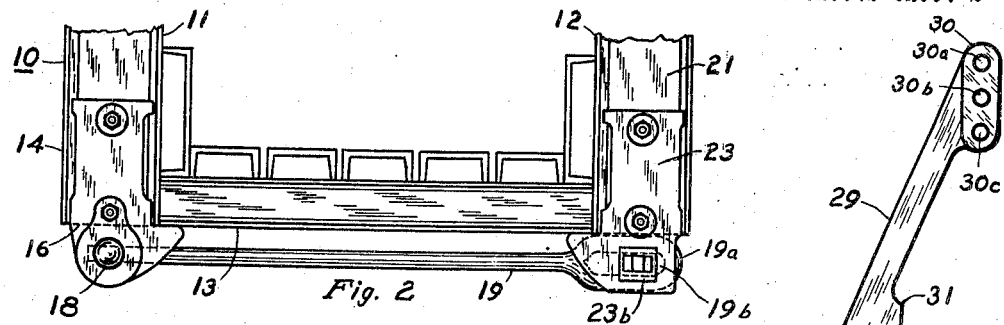
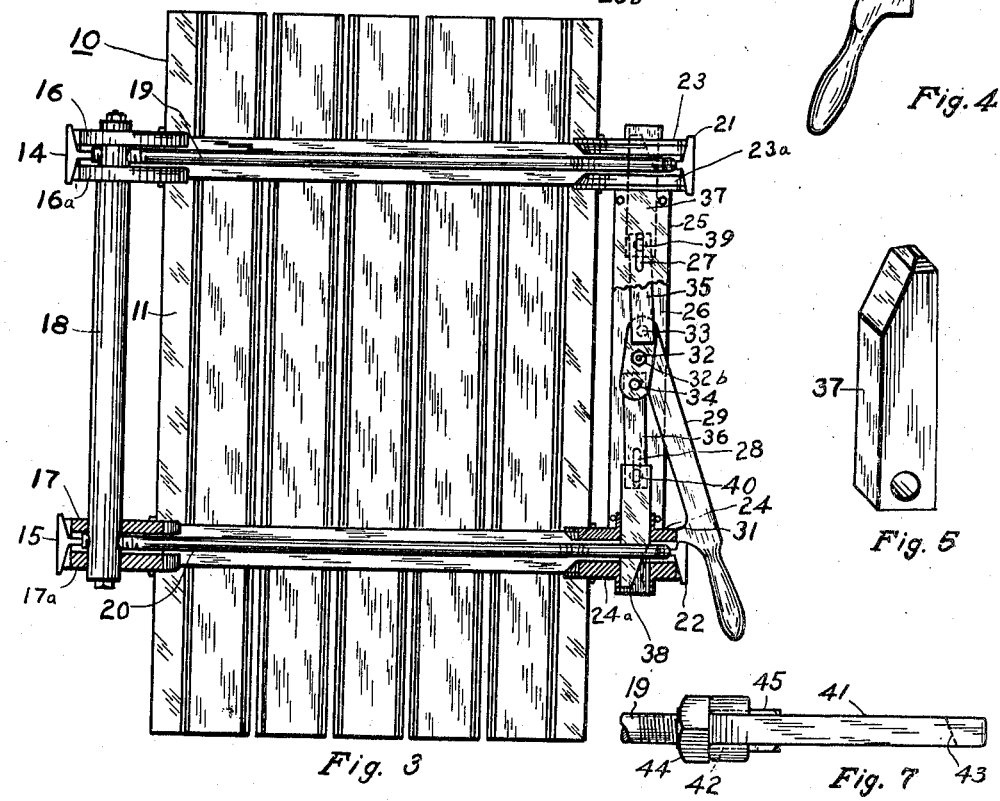
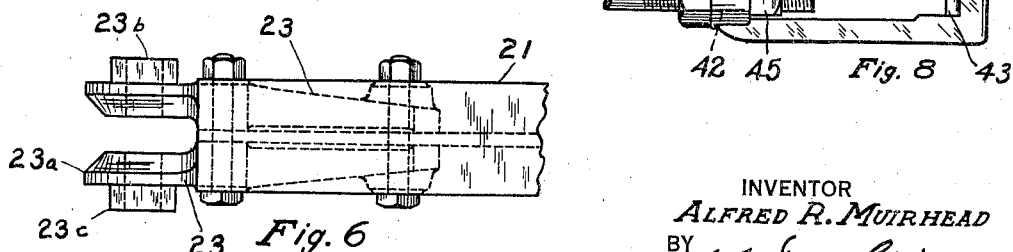
INVENTOR
ALFRED R. MUIRHEAD
BY
ATTORNEY Patented Nov. 8, 1938

2,136,147

UNITED STATES PATENT OFFICE 2,136,147

LOCKING DEVICE

Alfred R. Muirhead, Columbus, Ga., assignor to The Lummus Cotton Gin Company, Columbus, Ga., a corporation of Georgia Application August 15, 1935, Serial No. 36,387

4 Claims. (Cl. 100—19)

This invention relates to closures, and more specifically, to a new and improved locking device intended primarily for use with cotton press doors.

After being ginned, seed cotton is usually pressed into bales for the purpose of facilitating transportation and storage, large presses being employed to perform this function, in which presses a tremendous pressure is built up during the time the bale is being formed, after which it is necessary that the doors of the press be opened in order that the bale may be withdrawn, upon which the doors are closed, locked, and the pressing of another bale begun.

Heretofore various locking devices for the doors of cotton presses have been proposed, but most of these are complex, inconvenient, and often ineffective; many such devices having links or loose swinging parts that must be lifted and placed in position before locking the press doors; while others require great pressure to place in operative position and frequently open with difficulty, and then with a sudden jarring movement which is destructive to equipment and unsatisfactory or even dangerous to manipulate.

An object of the instant invention is to provide a locking device for cotton press doors and the like, which makes possible the locking of said doors under tremendous pressure, yet with but little effort on the part of the operator.

Another object is to provide positive locking of the press doors and holding such rigidly in place during the time the bale is being pressed.

Another object is to provide in a device of the instant character, mechanism providing for the release of the doors without jar, or the sudden springing apart thereof.

Another object is to provide for the gradual and silent release of cotton press doors.

A still further object is to provide easy release of the locking mechanism in a device of the instant type, regardless of the pressure against the press doors.

Another object is to provide in a device of the instant character, means for putting a broken bale of cotton back into the press for repressing, without tearing the bale apart.

Another object is to provide effectiveness, convenience, simplicity, reliability and economy in a locking device for cotton press doors.

These and other objects made apparent throughout the further progress of this specification, are accomplished by means of the instant invention, a full and complete understanding of which is made possible by reference to the drawings herein, in which:

Fig. 2 is a top view of the structure illustrated in Fig. 1.

Fig. 3 is an end view of a cotton press embodying the instant invention, certain parts likewise being broken away for clearness.

Fig. 4 is an enlarged side view of the operating lever of my device.

Fig. 5 is an enlarged view in perspective of one of the wedge tongues employed in the instant locking mechanism.

Fig. 6 is an enlarged side view of a pair of castings comprising part of the instant invention, said castings being shown bolted to a fragment of a door cross member.

Fig. 7 is a side view of a casting representing a modification of the instant invention, specifically in conjunction with the link bars thereof.

Fig. 8 is a top plan view of the structure illustrated in Fig. 7.

Like numerals refer to corresponding parts throughout the various figures of the drawings.

Figure 1:
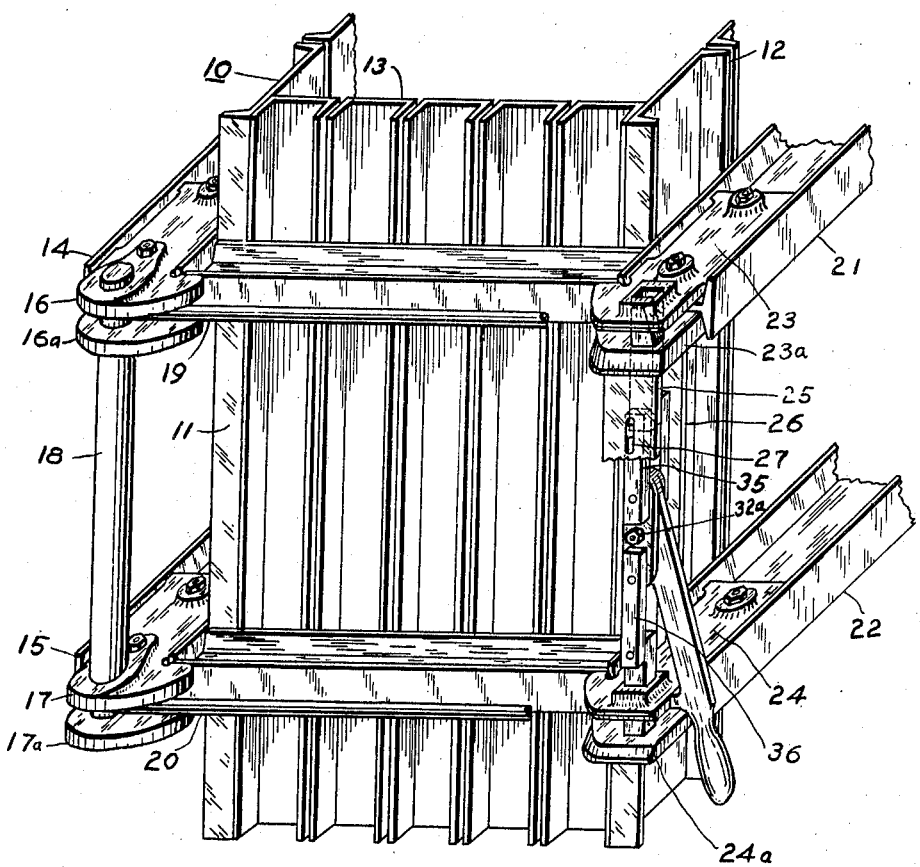
Fig. 1 is an enlarged fragmentary view in perspective of a standard cotton press with which is associated my wedge locking device, certain parts being broken away for the sake of clearness.

Referring now to the drawings, Figs. 1, 2, and 3, 10 represents what may be a standard cotton press, having doors 11, 12, and 13, with which is associated my locking device, the press not being shown in detail herein since my invention is capable of being adapted to any standard press, such machines being well known in the art. Bolted to the top and bottom cross members 14 and 15 of press door 11 in pairs, are castings 16, 16a, 17 and 17a, said castings being provided with circular apertures or holes to receive a vertically disposed steel shaft 18, which shaft is provided with a threaded hole near each of its ends and at right angles thereto, said holes registering with the space formed by the projection of each pair of castings beyond the ends of their supporting members (Fig. 3). Threaded and screwed into the holes thus provided in saft 18, is a pair of link bars 19 and 20, the opposite ends of each bar being turned back and welded so as to form an elongated slot or eye 19a (Fig. 2); while to provide an ample flat surface for contact with certain wedge tongues (described in detail hereafter), a short section of half round steel bar 19b may be welded into the outer extremity of eye 19a, the curved side of the bar being in contact with the curved inside of said eye and the flat side of the half round bar section forming an angle of approximately twenty-five degrees with the link bar proper.

Since shaft 18 is arranged to revolve freely in the holes in castings 16, 16a, 17 and 17a mentioned heretofore, it is apparent that link bars 19 and 20 will swing in unison through a considerable arc; and that by turning said bars in the holes provided for such in said shaft, proper adjustment of said bars in relation to the width of the press may be obtained, thereby insuring tight fitting of the doors when the lock is in operative position.

Bolted to upper and lower cross members 21 and 22 of door 12, in pairs, are castings 23, 23a, 24, and 24a, said castings having a rectangular opening 23b (Fig. 2) extending therethrough, and likewise through the rectangular housing section 23c (Fig. 6) which is formed integral with the castings. Clamped to opposite sides of housings 23c (as well as to a similar housing forming part of casting 24) are two side plates 25 and 26, each plate being provided with a vertically disposed elongated slot such as 27 and 28, near its ends.

The locking mechanism per se of my device comprises a handle or lever 29 (Fig. 4), one end of which is in the form of a bar 30 set at an acute angle to the handle portion of 29, in which bar are three equidistant holes 30a, 30b, and 30c. A lug 31 limits the downward throw of the lever against casting 24. The bar 30 of lever 29 is pivoted between the housing plates 25 and 26 by means of a bolt 32 passed through holes provided in said side plates for such purpose, and through hole 30b of said bar, said bolt being suitably associated with bushings such as 32a (Fig. 1), which serve to space said bar and lever from side plates 25 and 26, and being secured with a nut 32b at its end.

Pivoted to each extremity of bar 30 and on opposite sides thereof by means of pins 33 and 34 passed through holes 30a and 30c, are two pairs of link members 35 and 36, (Figs. 1 and 3), said link members in turn being pivoted at their opposite extremities to wedge-shaped tongues 37 and 38 (Figs. 3 and 5) as by pins 39 and 40, the sides of said pins being flattened so as to form guides working in cooperation with elongated slots 27 and 28 of side plates 25 and 26. The ends of wedge-shaped tongues 37 and 38 are preferably formed with an angle complementary to that in the end of link bars 19 and 20.

Figs. 7 and 8 illustrate a modification in the manner of forming the ends of the link bars, said modification taking the form of a casting 41 through one end of which is drilled a smooth hole 42, the opposite inside end of the casting being provided with a sloping wall 43 for the purpose of affording a smooth seating surface for the wedge tongues in much the same manner as when this construction is attained in the manner first described herein. If the modification is employed, rod 19 is provided with a right hand thread at one end, which is screwed into the bar 18 as in the original form; and with a left hand thread at the other end, which is passed through hole 42 of casting 41 and two left-hand threaded nuts 44 and 45 employed to hold the casting in position, this arrangement making possible adjustment when the device is in locked position, and in addition makes the repacking of broken bales much easier, as is explained hereafter.

In operation, my invention works as follows: Lever 29 is raised until the wedge-tongues 37 and 38 are entirely withdrawn from the openings between the castings 23 and 23a, and 24 and 24a it being apparent that an upward movement of said lever draws said tongues inwardly towards bar 30, by reason of the link and pivot arrangement described herein. The press doors are now swung into closed position, which brings link bars 19 and 20 very nearly into the proper position for locking, it being only necessary to swing said link bars into the openings or spaces provided between said castings, and then depress the lever 29, to complete the locking operation.

As at present used, when the wedge-tongues 37 and 38 make initial contact with the link bars 19 and 20, and more particularly, with the smooth seating surface 19b thereof, the press doors may be open as much as an inch from their normal closed position, but the forcing of the wedges outwardly by the knuckle action described herein, draws the press doors together, and when the bars are properly adjusted, said doors may be forced together against great pressure. It is to be noted that when the lever is depressed to locked position, the pivots 33 and 34 are somewhat past the center of side plates 25 and 26, thereby making it impossible to unlock the door without raising the lever, thus insuring a rigid, dependable and positive locking action during the pressing of the bale and for as long thereafter as desired.

It is also to be noted that the wedge shape of the locking tongues offsets to a great extent the friction between the wedge tongues and the link bars, the device being, therefore, easily locked or unlocked, even in the event of tremendous pressure being built up against the press doors.

The modified structure shown in Figs. 7 and 8, makes possible the placing of a broken bale of cotton back into the press for repressing without tearing the bale apart, this being done by placing the bale in the press and turning rod 19, as by means of a nut welded to the rod (not shown) or by a pipe wrench in the proper direction until the distance between the bar 18 and the casting 41 is several inches more than when the rod is in normal locking position. The press doors are now closed and the lock applied with the doors open several inches, the rod then being turned in the opposite direction until the doors are brought into position for repressing the bale. It is obvious, of course, that a like operation must be performed upon a corresponding rod such as 20, opposite rod 19, to accomplish the foregoing result.

When a bale has been formed and it is desired to unlock the press, the first upward movement of lever 29 permits the press doors to begin moving apart, yet the wedge-tongues, due to their tapered form, make this action a gradual one, and by the time the tips of said locking tongues have been withdrawn from the link bars, very little pressure remains against the inside of the press doors, full release being thereby accomplished without jar or sudden springing apart of the doors with attendant injury to equipment and danger to human life. The foregoing action is accounted for by the fact that while the pressure within the press acting outwardly against the doors is often tremendous, there is but slight expansion of the cotton when the doors are released, the opening of the doors less than an inch entirely relieving the pressure against them. It is further apparent that this wedge action by constantly tending to diminish the friction between the tongue and the link bar as the lever is raised, permits the easy release of the locking mechanism, regardless of the pressure against the press doors.

The knuckle joint action of lever 29 and the connecting links 35 and 36 in combination with the taper of the tongues 37 and 38, supplies a means for producing tremendous pressure with but slight manual effort, said pressure being subject to definite and minute regulation, however, and capable of being used to control expansive force created within the press as when the bale is being formed or upon the completion thereof; the locking device in its entirety representing a reliable, simple and effective instrumentality superior to anything now known to the trade.

While I have described my invention in connection with a cotton press herein, I do not intend to limit myself to this use, but on the contrary intend that I shall be accorded a broad range of uses for said device, in keeping with well established principles of patent law.

Further, while I have herein shown and described one specific embodiment of my invention and one modification thereof for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention, as will naturally suggest themselves to those skilled in the art, may be made without departing from the principles of said inventions, as defined by the appended claims.

I claim:

1. In a cotton press having separable side and end doors, a bar pivoted to one of said side doors and parallel with the normally vertical edges of said door, said bar having parallel, spaced apart screw-threaded apertures having their axes perpendicular to the pivot axis of said bar, a pair of parallel links in screw-threaded connection at one of their ends with said apertures and having slots formed in their other ends, a pair of keepers fixed to the other side door and provided with slots adapted to register with the slots in said links, a support fixed to and bridging the space between said keepers, a pair of bolts slidable on said support, and means for reciprocating said bolts simultaneously in opposite directions into or out of said slots, said bolts having their outer ends inclined to facilitate initial entrance into the said slots and to force said links into a position with their slots in complete registration with the slots in said keepers with the intervening end door clamped between said side doors.

2. In a cotton press having separable side and end doors, a bar pivoted to one of said side doors and parallel with the normally vertical edges of said door, a pair of spaced apart parallel links screw-threaded at one end of each into said bar for lengthwise adjustment perpendicular to the pivot axis of said bar and adapted to swing together across an end door and the adjacent edge of the other side door, castings mounted to rotate and slide lengthwise on the other ends of said links, means for securing said castings in lengthwise adjusted positions on said links, said castings being provided with slots, keepers fixed to the other side door and adapted to register with the slots in said castings when the end door is clamped between said side doors, a support fixed to and bridging the space between said keepers, a pair of bolts slidable on said support into and out of the slots in said keepers, and means slidably and pivotally connected to said bolts to slide them in opposite directions simultaneously into and out of the keeper slots, said bolts having their outer ends tapered to facilitate initial entrance into the slots of said links when in part registration with the slots in said keepers, and to slide against the outer ends of the slots in said links to complete the registration of the slots.

3. In a cotton press having separable side and end doors, a bar pivoted to one of said side doors and parallel with the normally vertical edges of said door, said bar having parallel, spaced apart screw-threaded apertures having their axes perpendicular to the pivot axis of said bar, a pair of parallel links in screw-threaded connection at one of their ends with said apertures and having slots formed in their other ends, a pair of keepers fixed to the other side door and provided with slots adapted to register with the slots in said links, a support fixed to and bridging the space between said keepers, a pair of bolts slidable on said support, and means for reciprocating said bolts simultaneously in opposite directions into or out of said slots, said bolts having their outer ends inclined to facilitate initial entrance into the said slots and to force said links into a position with their slots in complete registration with the slots in said keepers with the intervening end door clamped between said side doors, each link being rotatable about its axis to vary the distance between its slotted end and the pivot axis of said bar.

4. In a cotton press having separable side and end doors, a bar pivoted to one of said side doors and parallel with the normally vertical edges of said door, a pair of spaced apart parallel links screw-threaded at one end of each into said bar for lengthwise adjustment perpendicular to the pivot axis of said bar and adapted to swing together across an end door and the adjacent edge of the other side door, castings mounted to rotate and slide lengthwise on the other ends of said links, means for securing said castings in lengthwise adjusted positions on said links, said castings being provided with slots, keepers fixed to the other side door and adapted to register with the slots in said castings when the end door is clamped between said side doors, a support fixed to and bridging the space between said keepers, a pair of bolts slidable on said support into and out of the slots in said keepers, and means slidably and pivotally connected to said bolts to slide them in opposite directions simultaneously into and out of the keeper slots, said bolts having their outer ends tapered to facilitate initial entrance into the slots of said links when in part registration with the slots in said keepers, and to slide against the outer ends of the slots in said links to complete the registration of the slots, each link being rotatable while said castings are in locked engagement with said keepers to vary the distances between said castings and the pivot axis of said bar.

ALFRED R. MUIRHEAD.